Patented Sept. 20, 1932

1,878,650

UNITED STATES PATENT OFFICE

STEPHEN SWARTZ, OF LONG BEACH, CALIFORNIA, ASSIGNOR TO JENKINS PETROLEUM PROCESS COMPANY, OF CHICAGO, ILLINOIS, A CORPORATION OF WISCONSIN

PROCESS FOR CLARIFICATION OF HYDROCARBONS CONTAINING SUSPENDED OR COLLOIDAL COMPLEXES

No Drawing.   Application filed February 2, 1929. Serial No. 337,167.

This invention relates to certain improvements in the clarification of hydrocarbons in general and particularly to a process for discharge of suspended or colloidal complexes and their removal from petroleum hydrocarbon intermediates and residuals.

In the liquid residuum from the dry distillation of crude hydrocarbons and particularly as obtained from the cracking of petroleum hydrocarbons, there is usually produced among other impurities a varying colloidal content of free carbon and semi-solid asphaltic complexes of high molecular weight, alike detrimental to the continuity of the process and the quality of the residuum produced. Such objectionable results of colloidal formation have been completely overcome in the development of a cracking process well known in the art, by the employment of finely divided hydrate of lime as an adsorbent, in intimate contact with the petroleum hydrocarbon undergoing cracking, such process being the subject of a copending application. The fuel like residue continuously produced by such process commonly carries in initial suspension a partially coagulated complex of hydrate of lime, in which various colloidal impurities incident to cracking, such as free carbon, asphaltic bodies of high molecular weight, etc., are adsorbed; such complex usually settling in a zone of repose and producing a supernatant fuel oil of acceptable marketable specification.

Where however the cracking of heavy crudes or residuals is practiced by such previously mentioned process, or where the final residuum produced approaches in specific gravity the limiting specific gravity of the lime complex which becomes specifically lighter as its lime component adsorbs increased quantities of colloidal decomposition products and enveloping medium (a condition especially obtaining when cracking the previously mentioned heavy crudes or residual petroleum hydrocarbons in the presence of an excess of hydrate of lime); such complex remains in the final residuum continuously withdrawn from the system, rendering such residuum unsalable under the usual marketable requirements for admissible insoluble matter.

Various methods have been proposed for the breaking down and removal of such suspended or colloidal complexes together with their resultant coagulates, with attainment of the enveloping hydrocarbon medium in a state of clarification as the chief objective. For example: treatment with sulphuric acid, followed by settling; centrifuging at high temperatures; and filtration through diatomaceous earth have been employed with varying success; but all such methods have fallen short of the optimum, especially where considerable quantities of hydrate of lime are present; often involving either loss of desirable material, excessive amounts of corrective employed, production of undesirable gummy acid complexes, and/or emulsions or jelly like pastes that quickly clog the instrumentalities involved.

A specific object of the invention is to effect the clarification of a liquid petroleum hydrocarbon containing a suspended colloidal complex, of which hydrate of lime is a component part, by discharging the colloidal condition of such complex and removing the resultant coagulate from such liquid petroleum hydrocarbon, without appreciable loss or detrimental action to the latter product.

An incidental object to the invention is to effect the clarification of a liquid hydrocarbon containing a colloidal and/or semi-colloidal complex, by discharging the suspended colloidal condition of such complex and removing the resultant coagulate from such liquid hydrocarbon, without appreciable loss or detrimental action to the original components of the colloidal complex or coagulate produced.

To attain such previous described objectives, an important general preliminary purpose of the invention is to inhibit the ionization of such component of a colloidal complex of which an adsorbent having the effect of hydrate of lime is a part existing in a liquid hydrocarbon medium, by the introduction to such colloidal zone of a corrective electrolyte, of such composition as to lower the potential ionic difference of the opposed ions to the point of colloidal discharge; without such introduced electrolyte itself undergoing substantial ionization.

A specific preliminary object of the invention, where a colloidal complex existing in a liquid hydrocarbon medium contains free hydrate of lime, is to introduce to such colloidal zone a corrective electrolyte, of such composition as to change the pH concentration to the potential ionic difference necessary to discharge of such existing colloidal condition; without such introduced electrolyte itself undergoing substantial ionization.

A further preliminary purpose of the invention, corollary to the two immediately preceding objectives, is the employment of the corrective electrolyte in a solution inhibitive of substantial ionization, and in addition to the conditions already imposed, such electrolyte should be preferably soluble in a petroleum hydrocarbon liquid over a wide range of temperatures.

An important object of the invention is to effect the introduction of said corrective electrolyte to the colloidal zone in such quantity, state of concentration and manner, as to secure a surface and/or film reaction between the electric ionic charges involved, rather than effecting any substantial molecular chemical transformation in the complex to be discharged.

An equally important related object of the invention is to secure such film reaction and reduction of potential difference in the colloidal system as may be necessary to effect its discharge, by the introduction of said corrective electrolyte as an adsorbed film in a substantially neutral finely divided adsorptive media, such as diatomaceous earth, fuller's earth and the like; to thoroughly incorporate such adsorbent (pretreated to the point of saturation) with the colloidal mixture to be clarified, and to finally separate the resultant coagulate produced, from its enveloping liquid medium, through the agency of a centrifuge, filter, filter press and/or other instrumentality well known in the art.

An additional object of the invention, resembling the preceding, but of less efficient degree per unit of material employed, involves the replacement of the pretreated substantially neutral adsorbent with an increased quantity of similarly treated inert material of nonadsorptive character, but of such physical absorbent characteristics as to admit of sufficient surface action as to produce coagulation and permit of subsequent filtration; fine sand for example, being typical of such class of material.

A further general object of the invention is to effect colloidal discharge and subsequent separation of the coagulated complex from its enveloping hydrocarbon medium, at temperatures respectively best suited for such discharge and removal of such coagulate; with due regard to the viscosity and other physical characteristics of the hydrocarbon medium involved.

A final general object of the invention is to effect the separation of the discharged colloidal complex from its liquid hydrocarbon medium, under a force best suited to produce a maximum economic yield of required specification, clarified hydrocarbon, and a minimum quantity of substantially dry reject; and while such force of separation may be developed centrifugally, I obtain excellent results with a filter press of a type well known in the art, although continuous filtration, under any desired absolute pressure may be also employed to advantage.

While in general, only limiting myself to a type of corrective electrolyte within the specifications thus far imposed (the term electrolyte being held to mean a single or mixture of electrolytes), I prefer to employ for such purpose, where hydrate of lime is a component of the colloidal complex to be discharged, such naphthenic and/or sulfonaphthenic acids as are obtainable from the waste lyes of petroleum refining; such acids on account of their solubility in a petroleum solvent, and low ionization therein, proving ideal for securing the necessary pH concentration for colloidal correction. To secure optimum economic results from such naphthenic and/or sulfonaphthenic acids, I dissolve them in a petroleum solvent of low commercial value, such as gas oil, for example; employing such solution in a low state of acid concentration in quantity sufficient to saturate the adsorptive or inert carrier selected. I then incorporate such pretreated saturated adsorptive or inert absorbent carrier with the hydrocarbon containing the colloidal complex to be discharged, transfer the resultant mixture of hydrocarbon and coagulate to a filter press; and subsequently recover the hydrocarbon medium as a clarified, specification product, and the former colloidal complex as an essentially dry, non-colloidal, permeable, easily separable cake from the press, containing in addition to the original constituents of the complex, the added adsorptive and electrolyte; with such added adsorptive imparting a self-filtering value to the cake, and admitting to a marked degree of a thickness of formation, dependent upon the strength of the supporting cloth and/or screen, rather than from pressure developed by impedance of flow. Equally good results may be obtained by substituting the naphthenic acids obtained from waste lyes with petroleum and/or naphthenic and sulfonaphthenic acids obtaining in the so called "acid" oil, separable from sulphuric acid sludge; in which case the "acid" oil, properly diluted to the desired degree with an additional quantity of petroleum solvent may be employed direct to saturate the selected adsorptive; the steps of the process being otherwise identical.

The temperature at which incorporation of the pretreated adsorptive with the hydrocarbon to be clarified occurs, as well as the general composition of the latter, also has an effect on the colloidal discharge reaction, and a preliminary laboratory test best determines the proper quantities of the discharge agents to be employed for any clarification problem; but in general too great a concentration of electrolyte, excess of adsorptive, or operation at too elevated a temperature will produce gummy reaction products, greatly hindering the subsequent removal of the coagulate formed and the production of a maximum yield of clarified hydrocarbon.

In order that the invention may be better understood, reference will be made to a typical clarification problem, where the quantities of discharge agents are disclosed, but as all reactions may be conducted in apparatus well known to those skilled in the art of refining, no drawing accompanies the specification.

Thus, the clarification of an 8 A. P. I. gravity petroleum residuum product from a cracking plant, containing a semi-colloidal complex of 16 pounds to the 42 U. S. gallon barrel, of which 10–12 pounds are calcium compounds, with hydrate of lime in excess, will be considered. In such instance, optimum results have been secured by incorporating with such product at 350° F., in an ordinary jacketed mixer, fitted with the usual mechanical stirring device, a quantity of pretreated diatomaceous earth, screening approximately over 200 mesh to the inch, on the basis of one half pound of pretreated earth to the barrel of residuum to be clarified; and then transferring the mixture of residuum and coagulate produced to a filter press, building up a filtering pressure of approximately 100 pounds. For pretreatment of the diatomaceous earth, gas oil, containing naphthenic and sulfonaphthenic acids at a concentration of N/10 is employed, in volume sufficient to thoroughly saturate the earth, and to allow pumping of the treated material; the final results of such operation being a clarified petroleum residuum, containing less than 0.25% insoluble mineral matter; and an essentially dry, permeable cake in the filter press, easily detachable therefrom, and without gummy or sticky qualities.

It will be understood the process is not limited to the exact quantities, concentrations, temperatures and pressures disclosed in the preceding paragraphs, nor to any specific discharge agent previously described. Neither is the process restricted to any particular apparatus or instrumentality that has been mentioned as incidental to securing the desired objectives, nor need the exact order of process procedure thus far discussed be employed; as for example the process may be operated in batch, intermittently with such short intervals between phases as to be essentially continuous, or absolutely continuous according to the source of supply, which if at an elevated temperature may furnish any operative heat required; and what I claim is new, and desire to protect by Letters Patent is:

1. A process of clarifying petroleum hydrocarbon oil containing suspended or colloidal complexes of hydrated lime and associated carbon which comprises dissolving an organic acid containing a naphthene ring, such as naphthenic acid, in a petroleum solvent, such as gas oil; saturating a finely divided solid mineral adsorbent with such solution of said acid in said solvent; and introducing said adsorbent so treated into the petroleum hydrocarbon oil, whereby said suspended or colloidal complexes are contacted with said acid and coagulated.

2. A process of clarifying petroleum hydrocarbon oil containing suspended or colloidal complexes of hydrated lime and associated carbon which comprises dissolving an organic acid containing a naphthene ring, such as naphthenic acid, in a petroleum solvent, such as gas oil; saturating a finely divided solid absorbent with such solution of said acid in said solvent; and introducing said mineral absorbent so treated into the petroleum hydrocarbon oil, whereby said suspended or colloidal complexes are contacted with said electrolyte and coagulated.

3. A process of clarifying petroleum hydrocarbon oil containing suspended or colloidal complexes of hydrated lime and associated carbon which comprises dissolving a petroleum acid derived from the waste lyes of petroleum refining in a petroleum distillate, such as gas oil; saturating a finely divided mineral adsorbent, such as fuller's earth or diatomaceous earth, with such solution of said acid in said gas oil; and introducing said adsorbent so treated into the petroleum hydrocarbon oil, whereby said suspended or colloidal complexes are contacted with said acid and coagulated.

4. A process of clarifying petroleum hydrocarbon oil containing suspended or colloidal complexes of hydrated lime and associated carbon which comprises dissolving a petroleum acid, containing a naphthene ring, derived from the waste lyes of petroleum refining in a petroleum distillate, such as gas oil; saturating a finely divided mineral adsorbent, such as fuller's earth or diatomaceous earth, with such solution of said acid in said gas oil; and introducing said adsorbent so treated into the petroleum hydrocarbon oil, whereby said suspended or colloidal complexes are contacted with said acid and coagulated.

5. A process of clarifying petroleum hydrocarbon oil containing suspended or colloidal complexes of hydrated lime and associated carbon which comprises effecting a mixture of a petroleum acid, containing a naphthene ring, derived from the waste oil separable from the sulphuric acid sludge of petroleum refining with a petroleum distillate, such as gas oil; saturating a finely divided mineral adsorbent, such as fuller's earth or diatomaceous earth, with such mixture; and introducing said adsorbent so treated into the petroleum hydrocarbon oil, whereby said suspended or colloidal complexes are contacted with said mixture and coagulated.

6. In the treatment of petroleum hydrocarbon oil which has been subjected to a cracking reaction, wherein said oil contains suspended or colloidal hydrated lime associated with carbon and carbon forming substance, the process which comprises introducing into such oil a petroleum acid containing a naphthene ring dissolved in a petroleum distillate, such as gas oil; saturating a finely divided, solid mineral adsorbent such as fuller's earth or diatomaceous earth with said solution of said acid in said distillate; introducing said adsorbent so treated into the petroleum hydrocarbon oil, whereby said suspened or colloidal complex is contacted with said acid and coagulated; and removing said coagulated complex from the remaining liquid petroleum hydrocarbon oil by filtration.

7. A process of clarifying petroleum hydrocarbon oil containing suspended or colloidal complexes of hydrated lime and associated carbon which comprises dissolving a petroleum acid derived from the waste lyes of petroleum refining and substantially insoluble in water in a petroleum distillate, saturating a finely divided mineral adsorbent with such solution of said acid in said distillate; introducing said adsorbent so saturated into the petroleum hydrocarbon oil, intimately contacting said suspended or colloidal complexes with the acid saturated adsorbent whereby the former are coagulated, and removing the coagulated complexes of hydrated lime and associated carbon from the petroleum hydrocarbon oil.

8. A process of clarifying petroleum hydrocarbon oil containing suspended or colloidal complexes of hydrated lime and associated carbon which comprises diluting waste oil separable from the sulphuric acid sludge of petroleum refining and substantially insoluble in water with a petroleum distillate inhibitive of substantial ionization, saturating a finely dvided mineral adsorbent with such diluted waste oil; introducing said adsorbent so saturated into the petroleum hydrocarbon oil, intimately contacting said suspended or colloidal complexes with the saturated adsorbent whereby the former are coagulated, and removing the coagulated complexes of hydrated lime and associated carbon from the petroleum hydrocarbon oil.

9. A process of clarifying petroleum hydrocarbon oil containing suspended or colloidal complexes of hydrated lime and associated carbon which comprises dissolving an organic electrolyte of acid reaction and substantially insoluble in water in a solvent inhibitive of substantial ionization, saturating a finely divided mineral adsorbent with such solution of said electrolyte; introducing said adsorbent so saturated into the petroleum hydrocarbon oil, intimately contacting said suspended or colloidal complexes with the saturated adsorbent whereby the former are coagulated, and removing the coagulated complexes of hydrated lime and associated carbon from the petroleum hydrocarbon oil.

10. A process of clarifying petroleum hydrocarbon oil containing suspended or colloidal complexes of hydrated lime and associated carbon which comprises dissolving a petroleum acid derived from the waste lyes of petroleum refining and substantially insoluble in water in gas oil, saturating a finely divided mineral adsorbent, such as diatomaceous earth, with such solution of said acid in said gas oil; introducing said adsorbent so saturated into the petroleum hydrocarbon oil, intimately contacting said suspended or colloidal complexes with the acid saturated adsorbent whereby the colloidal condition of said complexes is discharged and said complexes are coagulated, and removing the coagulated complexes of hydrated lime and associated carbon from the petroleum hydrocarbon oil.

11. A process of clarifying petroleum hydrocarbon oil containing suspended or colloidal complexes of hydrated lime and associated carbon which comprises dissolving an organic electrolyte of acid reaction and substantially insoluble in water in gas oil, saturating a finely divided mineral adsorbent, such as diatomaceous earth, with said electrolyte in solution; introducing said adsorbent so saturated into the petroleum hydrocarbon oil, intimately contacting said suspended or colloidal complexes with said saturated adsorbent whereby the colloidal condition of said complexes is discharged and said complexes are coagulated, and removing the coagulated complexes of hydrated lime and associated carbon from the petroleum hydrocarbon oil.

12. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, saturating a finely divided solid mineral adsorbent, such as fuller's earth or diatomaceous earth, with waste oil separable from the sulphuric acid sludge of petroleum refining, dispersing said adsorbent so treated throughout said fuel oil to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

13. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, introducing a petroleum acid derived from the waste lyes of petroleum refining into said fuel oil, intimately contacting said suspended or colloidal complexes of lime and associated carbonaceous material contained in said fuel oil with said petroleum acid introduced therein to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

14. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, introducing waste oil separable from the sulphuric acid sludge of petroleum refining into said fuel oil, intimately contacting said suspended or colloidal complexes of lime and associated carbonaceous material contained in said fuel oil with said waste oil introduced therein to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

15. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, introducing an organic acid containing a naphthene ring, such as naphthenic acid, into said fuel oil, intimately contacting said suspended or colloidal complexes of lime and associated carbonaceous material contained in said fuel oil with said organic acid introduced therein to effect such coagulation of said suspended or collidal complexes as to permit settling thereof, settling the coagulated complexes of hydrated lime and associated carbonaceous material from said fuel oil, and drawing off the fuel oil thus clarified and substantially free from carbon and other objectionable solid materials.

16. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, dissolving a petroleum acid derived from the waste lyes of petroleum refining in a petroleum solvent, such as gas oil, introducing such solution of said acid into said fuel oil, intimately contacting said suspended or colloidal complexes of lime and associated carbonaceous material contained in said fuel oil with said acid in solution introduced therein to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

17. A method of producing fuel oil substantially free from carbon and other objectionable solid materials which comprises adding lime to hyrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, diluting waste oil separable from the sulphuric acid sludge of petroleum refining with a petroleum distillate, such as gas oil, introducing such diluted waste oil into said fuel oil, intimately contacting said suspended or colloidal complexes of lime and associated carbonaceous material contained in said fuel oil with said diluted waste oil introduced therein to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

18. A method of producing fuel oil substantially free from carbon and other objectionable solid materials which comprises adding lime to hydrocarbon oil and subjecting such oil to cracking conditions to obtain vaporous products and unvaporized fuel oil containing suspended or colloidal complexes of lime and associated carbonaceous material formed in the hydrocarbon oil under said cracking conditions, withdrawing said fuel oil from said cracking conditions, dissolving an organic acid containing a naphthene ring, such as naphthenic acid, in a petroleum solvent, such as gas oil, introducing such solution of said acid into said fuel oil, intimately contacting said suspended or colloidal complexes of lime and associated carbonaceous material contained in said fuel oil with said acid in solution introduced therein to effect such coagulation of said suspended or colloidal complexes as to permit settling thereof, settling the coagulated complexes of hydrated lime and associated carbonaceous material from said fuel oil, and drawing off the fuel oil thus clarified and substantially free from carbon and other objectionable solid materials.

In testimony whereof I have affixed my signature.

STEPHEN SWARTZ.